United States Patent [19]

Kemp

[11] 3,907,913

[45] Sept. 23, 1975

[54] ISOMERIZATION PROCESS

[75] Inventor: Jacob D. Kemp, El Cerrito, Calif.

[73] Assignee: Chevron Research Company, San Francisco, Calif.

[22] Filed: June 11, 1974

[21] Appl. No.: 478,406

Related U.S. Application Data

[63] Continuation-in-part of Ser. No. 422,621, Dec. 7, 1973, which is a continuation-in-part of Ser. No. 268,296, July 3, 1972, abandoned.

[30] Foreign Application Priority Data

June 19, 1973 Germany............................ 2231043
June 5, 1973 Canada................................ 173287

[52] U.S. Cl...... 260/666 P; 260/683.68; 260/666 R
[51] Int. Cl.²............................................ C07C 5/28
[58] Field of Search ........ 260/666 P, 666 R, 683.68

[56] References Cited

UNITED STATES PATENTS 2,425,268 8/1947 Sensel............................ 260/683.68
3,201,494 8/1965 Oelderik....................... 260/683.68

*Primary Examiner*—Veronica O'Keefe
*Attorney, Agent, or Firm*—G. F. Magdeburger; R. H. Davies

[57] ABSTRACT

The deactivation rate for a supported acidic catalyst, especially for a supported acid catalyst such as a supported $HF \cdot SbF_5$ catalyst, used in a process for isomerizing a feed comprising methylcyclopentane, cyclohexane, or mixtures thereof, at low temperature, is sharply reduced by including sufficient isobutane in the feed so that the feed isobutane content is 25 to 75 weight percent.

9 Claims, No Drawings

ISOMERIZATION PROCESS

RELATED APPLICATIONS

This application is a continuation-in-part of U.S. Ser. No. 422,621, filed Dec. 7, 1973, which in turn is a continuation-in-part of Ser. No. 268,296, filed July 3, 1972, now abandoned, the disclosures of which parent cases are hereby incorporated by reference.

BACKGROUND OF THE INVENTION

The present invention relates to the isomerization of methylcyclopentane, cyclohexane or mixtures thereof using a supported acidic catalyst; more particularly, the present invention relates to the isomerization of methylcyclopentane to cyclohexane using a strong-acid, supported catalyst, especially a supported HF-antimony pentafluoride catalyst, at low temperatures such as below 400°F, and especially below 120°F. The production of cyclohexane (a raw material for nylon manufacture) by isomerization of methylcyclopentane is particularly desirable because of the value of benzene which has previously been hydrogenated to form cyclohexane.

The present invention is particularly directed to what may be called ultra-low-temperature isomerization. Thus reference below is made briefly to isomerization in general and then especially to ultra-low-temperature isomerization Isomerization processes can be divided into high, low, and ultra-low temperature processes. Rough temperature ranges are: 500°–800°F for high-temperature isomerization; 150°–400°F for low-temperature isomerization, and −50°F to 150°F for ultra-low-temperature isomerization.

In typical high-temperature isomerization, a pentane-hexane feed, combined with a normal pentane recycle stream, is fractionated to take isopentane overhead. The fractionator bottoms are mixed with hydrogen, preheated and charged to a reactor. Reactor effluent is cooled and flashed to separate recycle hydrogen from the product, which is stabilized and then depentanized, the pentanes being recycled to the deisopentanizer. Isopentane overheads from the deisopentanizer and the isohexane bottoms from the depentanizer constitute the product.

Typical reaction conditions are:

| Catalyst | Pt on $Al_2O_3$ or $Al_2O_3$—$SiO_2$ |
| --- | --- |
| Temperature, °F. | 700–900 |
| Pressure, psi | 300–700 |
| Space velocity, wt/hr/wt | 1–6 |
| $H_2$ recycle, mol/mol | 2–6 |
| Halide promoter | yes, if base is $Al_2O_3$ |
| Regeneration | steam-air |

For typical low-temperature isomerization the catalyst used is $AlCl_3$ + HCl. Low-temperature isomerization feedstock, dried and preheated to reaction temperature, is combined with a recycle stream (if recycling is practiced), mixed with hydrogen chloride, and passed through a reactor and an aluminum chloride recovery section. Reactor effluent is cooled and flashed to discharge any light gases through a small absorber that recovers hydrogen chloride carried off in the gases. Liquid from the flash drum is stripped to recover hydrogen chloride, and is caustic-washed to remove the last traces of acid. The stripping column is usually operated at a pressure high enough that the stripped hydrogen chloride can be returned directly to the reactor. If recycling of unconverted normal paraffin is practiced, the recycle stream is then fractionated from the product.

Typical reaction conditions are:

| Catalyst | $AlCl_3$—HCl |
| --- | --- |
| Inhibitor | $H_2$ (60 psi) |
| Pressure, psi | 300 |
| Temperature, °F. | 176–212 |
| Space velocity, V/V/hr. | 1.0–2.5 |
| HCl concentration, wt.% | 5 |
| Conversion, % | 60 |

Ultra-low-temperature isomerization so far has not been commercially employed. However, there is considerable incentive to develop a commercially attractive low-temperature isomerization process because the lower the temperature the more favorable is the equilibrium for isoparaffin relative to normal paraffins. Ultra-low temperatures are especially attractive for substantial production of the very-high-octane dimethylbutanes.

U.S. Pat. No. 2,956,095 describes an ultra-low-temperature isomerization process employing fluorosulfonic acid catalyst instead of a Friedel-Crafts type catalyst such as $AlCl_3$. According to U.S. Pat. No. 2,956,095, process reaction conditions include a temperature between 32° and 80°F, pressure between 0 and 50 psig, and added hydrogen of 0–200 cubic feet per barrel of feed. The process of the U.S. Pat. No. 956,095 also employs a compound capable of forming a stable carabonium ion as part of the catalyst system. Preferably tertiary butyl alcohol is used as the favored compound to form a stable carbonium ion; the tertiary butyl alcohol is said in the patent to be a carbonium ion "activator".

U.S. Pat. No. 3,201,494 is directed to liquid-phase isomerization of hydrocarbons using a hexafluoroantimonic acid catalyst in hydrofluoric acid, which catalyst is obtained, according to Example 1 of the patent, by dissolving antimony pentafluoride in hydrofluoric acid. A related patent, U.S. Pat. No. 3,394,202, is directed to isomerization also using an antimony fluoride-hydrofluoric acid catalyst but in the U.S. Pat. No. 3,394,202 the catalyst is supported on a base such as fluorided alumina.

Example VII of U.S. Pat. No. 3,201,494, shows the acceleration of n-pentane isomerization by adding isobutane. The feedstock in all of the runs of Example VII contained 3 weight percent methylcyclopentane. As can be seen from Table III of the patent, no acceleration of the reaction was obtained for isobutane contents above 9.2 weight percent in the feed. The highest isobutane content of any of the feeds isomerized in U.S. Pat. No. 3,201,494 was 22.8 weight percent isobutane for the feed in Example VIII.

The feedstocks of the examples in U.S. Pat. No. 3,394,202 were n-pentane plus methylcyclopentane containing no isobutanes. According to U.S. Pat. No. 3,394,202:

"Paraffin isomerization [with the supported antimony fluoride] is effected at about −10° to 60°C., preferably 10° to 50°C. In $C_5$–$C_7$ isomerization, the reaction rate may be increased appreciably by the addition of 5–25% w.; isobutane, which does not participate in the reaction. Examples of other conversions which may be carried out with the present catalyst are described in copending application Ser. No. 284,806 [now U.S. Pat. No. 3,201,494].

"Gradual deactivation of the catalyst, which may occur because of the presence of impurities in the feed or because of small amounts of polymerization products, may be suppressed by effecting the reaction in the presence of 1–3% m. hydrogen, based on the hydrocarbon feed. This hydrogen may be fed to the reactor as a gas, or may be partially or completely dissolved in the hydrocarbon feed."

U.S. Pat. No. 3,394,202 discloses, as can be seen from the portion quoted above, without any exemplary data, that 5–25 weight percent isobutane may be used to increase the $C_5$–$C_7$ isomerization reaction rate. There is no enabling disclosure in either U.S. Pat. No. 3,394,202 or U.S. Pat. No. 3,201,494 that isobutane of any concentration is helpful to improve the stability of the antimony pentafluoride catalyst system, nor is there any disclosure of improved stability (lower deactivation rate) of the catalyst system for isobutane contents above 20 weight percent.

Also, there is no enabling disclosure in the patents as to any synergistic effect of using isobutane together with methylcyclopentane or cyclohexane in an isomerization process.

SUMMARY

According to the present invention, in a process for isomerizing a feed comprised of methylcyclopentane, cyclohexane, or mixtures thereof, by contacting the feed with a supported acidic catalyst, preferably a catalyst comprising hydrofluoric acid-antimony pentafluoride supported on a porous solid support, and wherein the contacting is carried out at a low temperature between −10° and 400°F, the improvement is made which comprises reducing the deactivation rate of the catalyst by including sufficient isobutane in the feed so that the feed isobutane content is 25 to 75 weight percent, preferably 30 to 60 weight percent.

DETAILED DESCRIPTION OF THE INVENTION

The present invention, as summarized above, will now be described in detail.

The methylcyclopentane or cyclohexane feed which is isomerized according to the process of the present invention can include some branched isoparaffins, such as singly and doubly branched hexane, as well as normal paraffins, e.g., $C_5$ through $C_7$ normal paraffins. Preferably no higher than $C_{12}$ paraffins are included in the feed. The components of the feed, other than the methylcyclopentane, cyclohexane or mixtures thereof and isobutane constitute no more than 25 percent by weight of the total feed (the feed is defined here as including the isobutane), preferably less than 15% by weight of the total feed, and most preferably less than 5% by weight of the total feed. When these other components are $C_7$ paraffins and higher, they constitute no more than 15% by weight of the feed, preferably no more than 10% by weight of the feed. The most preferred feedstocks to the process of the present invention are those containing methylcyclopentane as the major component. However, it is to be understood that the feed (independent of the isobutane content) may have as the major component thereof (1) a mixture of cyclohexane and methylcyclopentane or (2) cyclohexane. The feed should preferably be substantially free of aromatic hydrocarbon components. By "substantially free" is meant that any unsaturated aromatic components are present in a total amount of less than 5 ppm, preferably less than 2 ppm, and most preferably less than 1 ppm. The process of the subject invention is operable with even higher levels of isobutane than 75% by weight. However, higher levels of isobutane are not as desirable since the higher the amount of isobutane in the feed, the more limited is the total conversion of the methylcyclopentane or cyclohexane on an absolute basis.

The catalyst used in the process of the present invention is a supported acidic catalyst, in the sense of a Lewis acid and/or Brønsted acid. Lewis and Brønsted acidity is explained in W. J. Moore's "Physical Chemistry" Third Edition, Prentice Hall, at pages 310 and 361. It is preferable and usual in the process of the present invention to use strong acids, for example, HF-antimony pentafluoride. For purposes of the present invention, a strong acid is defined as one which gives at least 10% conversion of normal pentane to isopentane at the following reaction conditions:

Temperature = 100°F.
Liquid Hourly Space Velocity = 0.25, or
Volume Feed per Hour per Volume Liquid Catalyst = 0.25
Pressure = Sufficient to maintain liquid-phase reaction conditions The acid catalysts used in the present invention are supported on a porous solid inert support. By "porous solid, inert support" is meant an inert support material having a porous structure and a surface area typically in the range of 1 to about 300 m²/gram or even higher. Preferably, the surface area will be in the range of about 1 to 100 m²/gram. The porous solid, inert support of the invention typically has pore diameters ranging from 10 to 1000 A.

The porous solid support of the subject invention is preferably selected from the inorganic oxide group consisting of alumina, zirconia, silica, silica-alumina, magnesia, chromia, and mixtures and combinations thereof. Other porous solid supports may also be used such as natural and synthetic crystalline aluminosilicate zeolites, such as zeolite, X, Y, mordenite, erionite, etc., as well as other natural materials such as bauxite, kieselguhr, kaolin, bentonite, diatomaceous earth and the like.

Particularly preferred porous solid, inert supports are made from alumina or are alumina-containing, e.g., fluorided alumina. Fluoriding the alumina to a substantial extent so as to obtain 60 weight percent fluorine or more in the fluorided support results in an improved support for the HF-antimony pentafluoride compared to an alumina support which has only been mildly fluorided such as one which has been fluorided only on the most exterior surfaces of the alumina.

Other porous solid supports such as polytetrafluoroethylene, carbon, e.g., charcoal, polytrichlorofluoroethylene, and the like may also be used. Charcoal used as the porous solid support may have a surface area as high as 1200 m²/gram. Basically, the support should be substantially inert to the acid catalyst, e.g., HF—$SbF_5$, and insoluble in the reaction mixture under isomerization reaction conditions. While the porous solid, inert support may initially be reactive to the acid catalyst component, e.g., HF—$SbF_5$, the supports are satisfactory if they can be rendered inert, for example by exposure to non-aqueous solutions of antimony pentafluoride and HF. Upon removal of the liquid, the porous solid supports are coated with a thin layer of inert fluoride.

In the present invention HF-antimony pentafluoride is an especially preferred catalyst. Preferably it is used as HF-antimony pentafluoride on fluorided alumina.

The temperature used in the process of the present invention is below 400°F, preferably below 150°F, and more preferably below 120°F.

The present invention is, among other factors, based on the finding that unexpectedly low deactivation rates are attained when using a strong acid catalyst, especially the hydrofluoric acid-antimony pentafluoride catalyst, if the methylcyclopentane or cyclohexane to be isomerized include 25 weight percent or more isobutane.

A particularly preferred temperature for the isomerization reaction of the present invention is found to be in the range of 30°–80°F, more preferably 40°–70°F, as it has been found that the temperatures above 80°F, and especially above 90°F, can contribute to increased deactivation rate for the isomerization catalyst used in the present invention.

The invention will be better understood by reference to the following examples.

EXAMPLE 1

A supported HF-antimony pentafluoride catalyst was prepared by contacting a fluorided alumina with a solution of HF-antimony pentafluoride. The catalyst was comprised of 68.5% by weight of the fluorided alumina-support (of which 60.4% by weight was fluorine) and 31.5% HF-antimony pentafluoride (of which 73.6% by weight was $SbF_5$) and had a surface area of 9 $m^2$/gram.

The catalyst was used in the isomerization of methylcyclopentane both in the absence and presence of isobutane. Reaction conditions and the results for the isomerization runs were as shown in Table 1 below.

TABLE I

| $LHSV^{(1)}$ | 0.83 | | 0.208 | |
|---|---|---|---|---|
| % Isobutane in Feed | 0 | 58.3 | 0 | 58.3 |
| Wt. % Conv.$^{(2)}$ 30 Hrs. into Test | 5.8$^{(3)}$ | 14.6$^{(4)}$ | 32$^{(5)}$ | 89.5$^{(5)}$ |
| Fouling Rate $\frac{\Delta \text{Log Conv.}}{\Delta t}$ hr$^{-1}$ | .0245 | .0008 | 0.0008 | <.0008 |

$^{(1)}$300 Psig, 50°F, LHSV based on total feed including Isobutane.
$^{(2)}$Wt. % Cyclohexane in Naphthene Cut
$^{(3)}$30 hours into run
$^{(4)}$50 hours into run
$^{(5)}$40 hours into run As can be seen from the table, the inclusion of isobutane in the methylcyclopentane caused a dramatic increase in the yield of cyclohexane and a dramatic decrease in the fouling rate.

EXAMPLE 2

A supported HF-antimony pentafluoride catalyst was prepared by contacting a fluorided alumina having a surface area of 4 $m^2$/gram and a fluoride content of 55 weight percent with a solution of $SbF_5$ dissolved in HF (51.5 weight percent $SbF_5$, balance HF).

The catalyst's isomerization activity was then tested by isomerizing a feed comprised of (1) about 70 weight percent of a $C_5$–$C_6$ low octane naphtha and (2) about 30 weight percent isobutane at a temperature of about 70°F and a pressure sufficient to maintain liquid phase.

After an extended successful operation, the catalyst was regenerated by passing a mixture of about 51 weight percent $SbF_5$ in HF through the catalyst and then again used successfully to isomerize a feed comprised of (1) about 70 weight percent of a $C_5$–$C_6$ low octane naphtha and (2) about 30 weight percent isobutane at a temperature of about 60°F and a pressure sufficient to maintain liquid phase.

After a second regeneration carried out by passing a mixture of about 50 weight percent $SbF_5$ in HF through the catalyst, the catalyst was used to isomerize the same feed described above for about 18 hours after which the feed was switched to a mixture of about 30 weight percent isobutane and about 70 weight percent methylcyclopentane.

Nominal run conditions were as set forth in Table II.

TABLE II

| $LHSV^{(1)}$ | 0.6 |
|---|---|
| Temperature | 50°F |
| Pressure | Sufficient to maintain liquid phase |

$^{(1)}$LHSV based on total feed including isobutane.

The conversion of methylcyclopentane to cyclohexane was maintained at about 90% for about 60 hours with no apparent fouling. After a number of feed changes and temperature variations, the same catalyst, without regeneration, was again used to isomerize a feed comprised of about 30 weight percent isobutane and about 70 weight percent methylcyclopentane to cyclohexane. A 90 volume percent conversion of the methylcyclopentane to cyclohexane was maintained for about 1,000 hours with no apparent fouling. During this run the temperature was a nominal 60°F and the LHSV varied between 0.4 and 1.0. The pressure was sufficient to maintain liquid phase.

What is claimed is:

1. In a process for isomerizing a feed comprising methylcyclopentane, cyclohexane, or mixtures thereof, by contacting the feed with a HF·$SbF_5$ catalyst on a porous solid inert support at a temperature between −10° and 400°F, the improvement which comprises reducing the deactivation rate of the catalyst by including sufficient isobutane in the feed so that the feed isobutane content is 30 to 60 weight percent and the naphthenes content in the feed is 70 to 40 weight percent.

2. The process of claim 1 wherein said temperature is between −10° and 150°F.

3. The process of claim 2 wherein said feed comprises isobutane and methylcyclopentane.

4. The process of claim 3 wherein said temperature is between 30° and 80°F.

5. The process of claim 4 wherein the isobutane content in the feed is about 30 weight percent and the methylcyclopentane content in the feed is about 70 weight percent.

6. The process of claim 1 wherein said acid catalyst on a porous solid inert support is $HF \cdot SbF_5$ on alumina.

7. The process of claim 6 wherein said feed comprises isobutane and methylcyclopentane.

8. The process of claim 7 wherein said temperature is between about 30° and 80°F and said inert support is fluorided alumina.

9. The process of claim 8 wherein the isobutane content in the feed is about 30 weight percent and the methylcyclopentane content in the feed is about 70 weight percent.

* * * * *